United States Patent
Barrat et al.

(10) Patent No.: US 9,292,318 B2
(45) Date of Patent: Mar. 22, 2016

(54) INITIATING SOFTWARE APPLICATIONS REQUIRING DIFFERENT PROCESSOR ARCHITECTURES IN RESPECTIVE ISOLATED EXECUTION ENVIRONMENT OF AN OPERATING SYSTEM

(71) Applicant: International Business Machines Corporation, Armonk, NY (US)

(72) Inventors: Frederic Barrat, Cugnaux (FR); Philippe Bergheaud, Colmar (FR); Luke M. Browning, Austin, TX (US); Khalid Filali-Adib, Austin, TX (US); Perinkulam I. Ganesh, Round Rock, TX (US); Randal C. Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 13/685,130

(22) Filed: Nov. 26, 2012

(65) Prior Publication Data
US 2014/0149977 A1 May 29, 2014

(51) Int. Cl.
*G06F 9/455* (2006.01)
*G06F 9/48* (2006.01)

(52) U.S. Cl.
CPC .............. *G06F 9/455* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 5,095,427 A | 3/1992 | Tanaka et al. | |
| 5,680,592 A | 10/1997 | Priem | |
| 6,496,847 B1 * | 12/2002 | Bugnion et al. | 718/1 |
| 7,149,878 B1 | 12/2006 | Jensen et al. | |
| 7,401,240 B2 | 7/2008 | Heller, Jr. et al. | |
| 7,461,275 B2 | 12/2008 | Belmont et al. | |
| 7,634,768 B2 | 12/2009 | Chen et al. | |
| 7,971,047 B1 * | 6/2011 | Vlaovic | G06F 8/63 713/1 |
| 8,028,290 B2 | 9/2011 | Rymarczyk et al. | |
| 8,127,121 B2 | 2/2012 | Yates, Jr. et al. | |
| 8,131,534 B2 | 3/2012 | Kinney | |
| 8,201,165 B2 * | 6/2012 | Nair | G06F 9/45533 718/1 |
| 8,276,137 B2 * | 9/2012 | Doyle et al. | 718/1 |
| 8,499,304 B2 * | 7/2013 | De Los Reyes | G06F 3/0488 718/106 |
| 9,122,712 B1 * | 9/2015 | Bono | G06F 3/064 |
| 2006/0004942 A1 * | 1/2006 | Hetherington | G06F 9/3802 711/3 |
| 2008/0235388 A1 * | 9/2008 | Fried | G06F 9/5088 709/231 |
| 2008/0244222 A1 * | 10/2008 | Supalov | G06F 9/5077 712/13 |
| 2008/0270829 A1 * | 10/2008 | Craft | G06F 11/1438 714/15 |

(Continued)

OTHER PUBLICATIONS

Adve et al., "LLVA: A Low-Level Virtual Instruction Set Architecture", Proceedings of the 36th International Symposium on Microarchitecture (MICRO-36 '03), 12 pages, IEEE, 2003.

*Primary Examiner* — Mengyao Zhe
*Assistant Examiner* — James J Lee
(74) *Attorney, Agent, or Firm* — Terrile, Cannatti, Chambers & Holland, LLP; Stephen A. Terrile

(57) ABSTRACT

A method, system and computer-usable medium are disclosed for managing virtual processor operations. A dynamic loader receives a request to initiate the creation of a new process, followed by a virtual processor being assigned to an isolated execution environment. The dynamic loader then initiates the creation of the new process by mapping kernel data associated with the virtual processor into the address space of the process. The dynamic loader completes the creation of the new process, and its execution is initiated within the isolated execution environment.

20 Claims, 4 Drawing Sheets

(56) References Cited

U.S. PATENT DOCUMENTS

| | | | | |
|---|---|---|---|---|
| 2009/0037718 A1* | 2/2009 | Ganesh | G06F 9/4416 | 713/2 |
| 2010/0064364 A1* | 3/2010 | Khan et al. | | 726/21 |
| 2010/0083283 A1* | 4/2010 | Kharat | G06F 9/5077 | 719/319 |
| 2010/0100892 A1* | 4/2010 | Fought | G06F 9/45533 | 719/328 |
| 2010/0132012 A1* | 5/2010 | van Riel | G06F 21/53 | 726/1 |
| 2010/0132013 A1* | 5/2010 | van Riel | G06F 21/53 | 726/1 |
| 2011/0010709 A1* | 1/2011 | Anand | G06F 9/5077 | 718/1 |
| 2011/0093848 A1* | 4/2011 | Filali-Adib | G06F 9/455 | 718/1 |
| 2011/0119678 A1* | 5/2011 | Filali-Adib | G06F 9/5077 | 718/105 |
| 2011/0246752 A1* | 10/2011 | Farrell | G06F 9/30003 | 712/225 |
| 2012/0011513 A1* | 1/2012 | McConaughy | G06F 9/545 | 718/100 |
| 2012/0131577 A1* | 5/2012 | Arcese et al. | | 718/1 |
| 2012/0198442 A1* | 8/2012 | Kashyap | G06F 8/62 | 718/1 |
| 2014/0229942 A1* | 8/2014 | Wiseman | G06F 9/45558 | 718/1 |

* cited by examiner

INITIATING SOFTWARE APPLICATIONS REQUIRING DIFFERENT PROCESSOR ARCHITECTURES IN RESPECTIVE ISOLATED EXECUTION ENVIRONMENT OF AN OPERATING SYSTEM

BACKGROUND OF THE INVENTION

1. Field of the Invention

The present invention relates in general to the field of computers and similar technologies, and in particular to software utilized in this field. Still more particularly, it relates to a method, system and computer-usable medium for managing virtual processor operations.

2. Description of the Related Art

Software applications are bound to the processor architecture upon which they execute. Flexible software applications are typically able to probe the processor or query the operating system (OS), and in turn, the processor or OS will return the current architecture. However, it may be desirable for the application to execute as if it were running on a processor architecture that is different than what it is actually running upon. Known approaches to this issue include hardware processor architecture emulation, or compatibility mode, where the processor is able to emulate a different (e.g., older) processor architecture. However, compatibility mode may not always be available. Furthermore, compatibility mode may require rebooting the system to change the processor mode. Moreover, compatibility mode may operate system-wide and as a result, impact other, unrelated software applications executing on the same system.

Another approach is software processor architecture emulation, where a virtual machine (VM) is implemented to emulate a processor architecture that is different than the architecture that it is actually running upon. However, VMs require an additional OS instance, which executes within the VM. Furthermore, VMs require processor support to intercept attempts to execute instructions that are not supported by the actual processor. Moreover, this support may not be available for all emulated instructions. In addition, this support, when available, degrades the performance of the application running in the VM.

Other known approaches include software application modification, where the software application may be modified to emulate a processor architecture that is different from what is actually being used. However, application modification is not always possible because source code and build chains may not be available. Furthermore, the modification, testing and deployment of a new application may be operationally disruptive and financially expensive. Moreover, modifying the application may not be sufficient, as system libraries used by the application may also query the operating system about the processor architecture. In view of the foregoing, there is a need for being able to select a predetermined processor architecture, different from what is actually being used, to execute a target software application during its lifetime.

SUMMARY OF THE INVENTION

A method, system and computer-usable medium are disclosed for managing virtual processor operations. In various embodiments, partitioning operations are performed to create an isolated execution environment, also referred to as a workload partition (WPARs), within a global execution environment. A dynamic loader receives a request to initiate the creation a new process, followed by a virtual processor being assigned to a target isolated execution environment.

In one embodiment, the assignment is performed by a user, who is provided a selection of virtual processor architectures within a user interface window. Once the selection is presented, the user selects the desired virtual processor. In another embodiment, the process has a preferred virtual processor architecture, which is automatically selected. In this and other embodiments, a user predetermines the preferred virtual processor architecture for a target process.

Once the virtual processor has been assigned, the dynamic loader initiates the creation of the new process by mapping kernel data associated with the selected virtual processor into the address space of the process. The dynamic loader then completes the creation of the new process, and its execution is initiated within the isolated execution environment. In various embodiments, a plurality of isolated execution environments is created in the global execution environment, each of which is assigned a corresponding virtual processor. In these and other embodiments, the respective architectures of the virtual processors are different from the architecture of the physical processor used by the global execution environment. In certain embodiments, the architectures corresponding to each of the plurality of virtual architectures are different.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
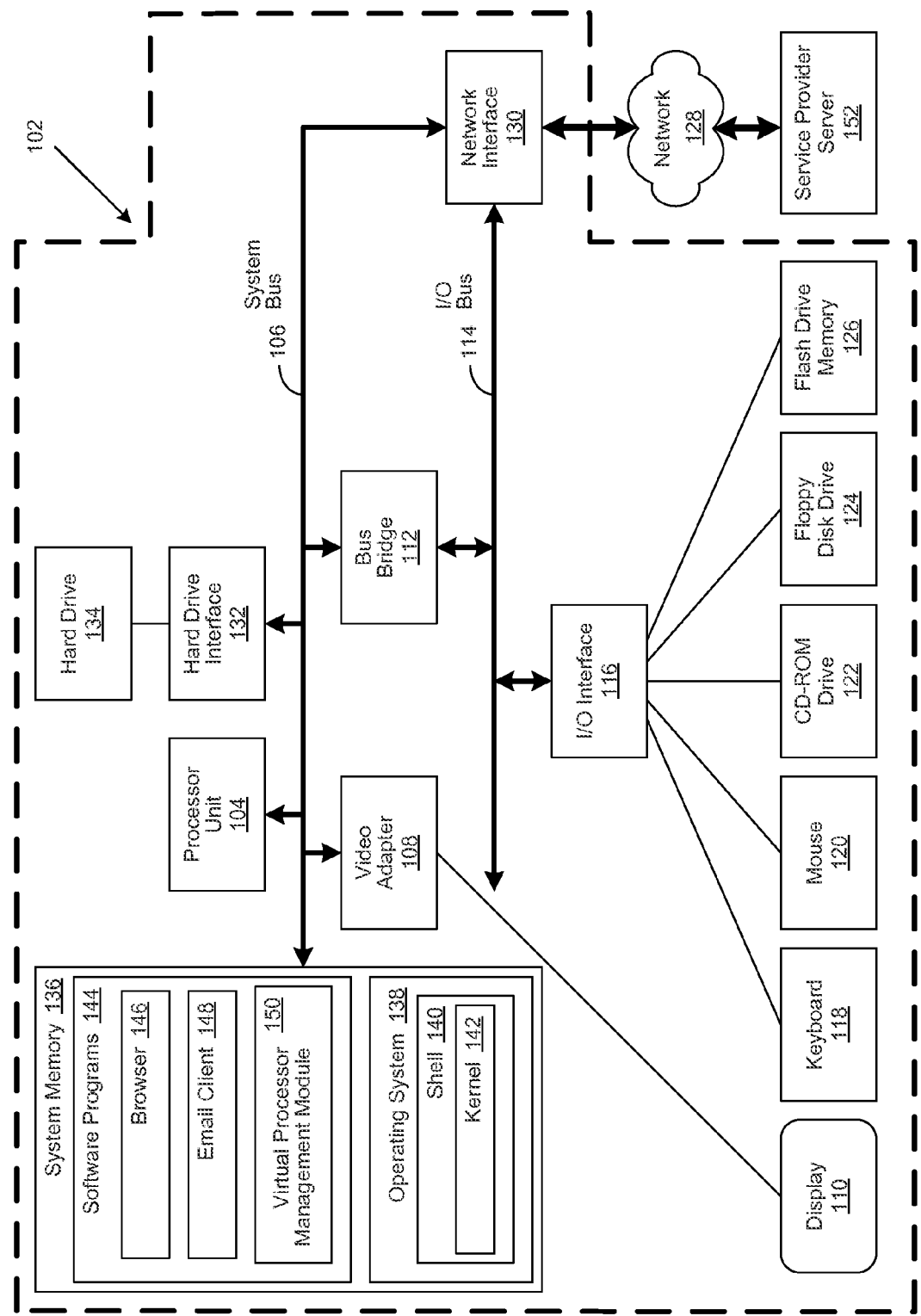
FIG. 1 depicts an exemplary client computer in which the present invention may be implemented.

A method, system and computer-usable medium are disclosed for managing virtual processor operations. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other pads of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a virtual processor management module 150. In these and other embodiments, the virtual processor management module 150 includes code for implementing the processes described hereinbelow. In one embodiment, client computer 102 is able to download the virtual processor management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
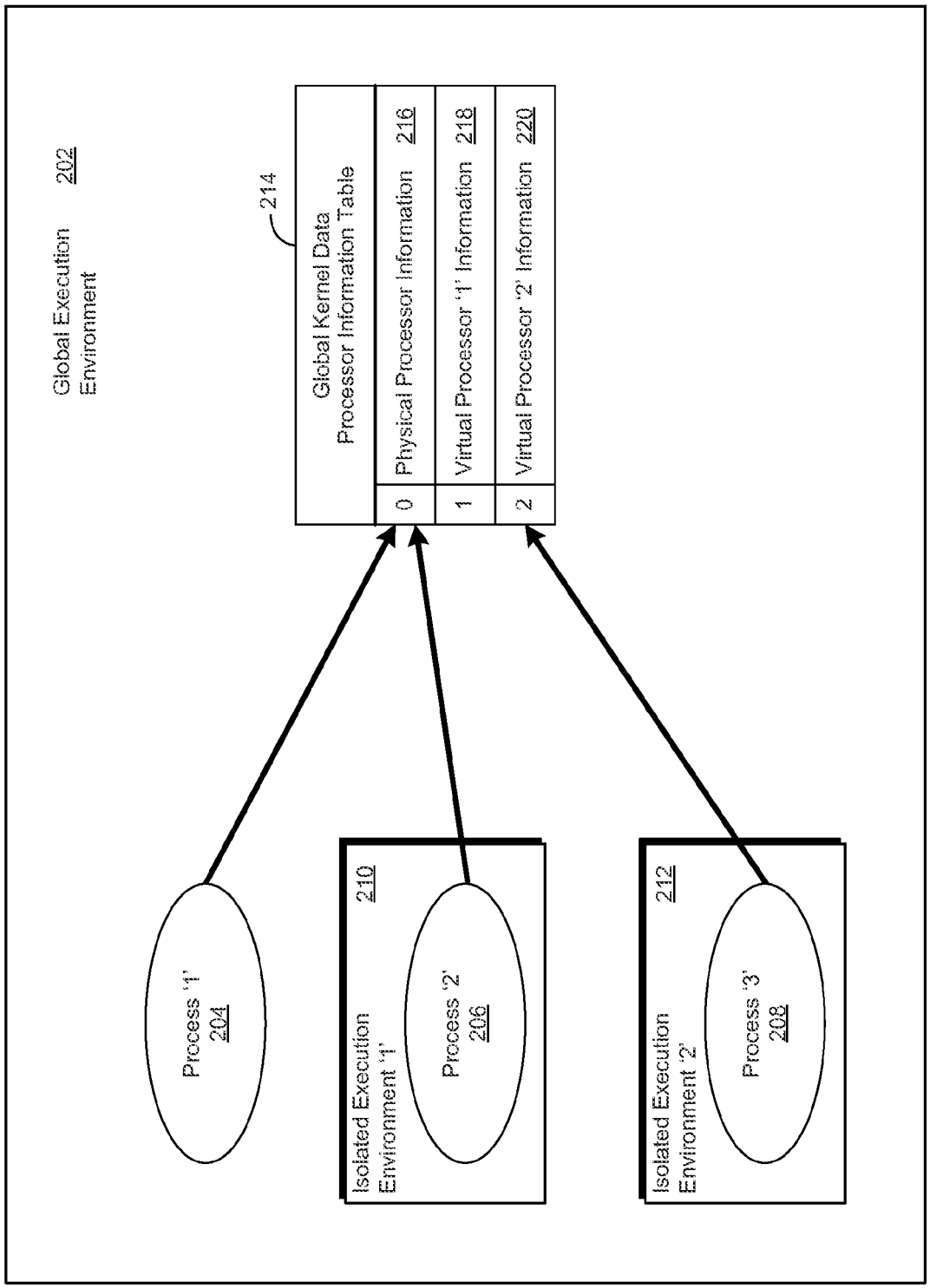
FIG. 2 is a simplified block diagram of an isolated execution environment implemented within a global execution environment.

FIG. 2 is a simplified block diagram of an isolated execution environment implemented in accordance with an embodiment of the invention within a global execution environment. In various embodiments, partitioning operations are performed to create one or more isolated execution environments, also referred to as workload partitions (WPARs), such as isolated execution environments '1' 210 and '2' 212, within a global execution environment 202. As used herein, a global execution environment 202 broadly refers to a non-virtualized, operating system environment. As likewise used herein, an isolated execution environment broadly refers to a virtualized operating system environment that is created within the global execution environment as a result of performing partitioning operations known to those of skill in the art.

In these and other embodiments, a processor information table 214 comprising global kernel data is implemented within the global execution environment 202. As used herein, global kernel data broadly refers to kernel data associated with a physical processor architecture 216, as well as kernel data associated one or more virtual processor architectures, such as virtual processor architectures '1' 218 and '2' 220. As used herein, kernel data broadly refers to data that describes the hardware capabilities of a predetermined processor architecture, whether physical or virtual. Such kernel data is typically stored in kernel low memory and is initialized at boot time with values that depend upon the hardware being used.

In various embodiments, the kernel data stored in the processor information table 214 is mapped into the address space of a process, such as process '1' 204, '2' 206, or '3' 208, where it can then be read directly without having to perform system calls. In one embodiment, process '1' 204 is initiated in the global execution environment 202 and physical processor information 216 is mapped into its address space. In another embodiment, partitioning operations are performed to create isolated execution environment '1' 210 within the global execution environment 202. Process '2' 206 is then initiated in the isolated execution environment '1' 210 and physical processor information 216 is mapped into its address space. In yet another embodiment, partitioning operations are performed to create isolated execution environment '2' 210 within the global execution environment 202. Process '3' 208 is then initiated in the isolated execution environment '2' 210 and virtual processor information 220 is mapped into its address space.

From the foregoing, it will be appreciated that the invention enables a system administrator to assign a predetermined virtual processor architecture to an isolated execution environment. As a result, software applications executing within the isolated execution environment will be presented attributes corresponding to the virtual processor architecture assigned by the administrator rather than attributes of the processor architecture that is actually being used. Conversely, applications running outside the isolated execution environment will continue to be presented with attributes of the actual processor architecture.

It will likewise be appreciated that the invention can be implemented without processor support (e.g., compatibility mode or instruction interception), without an additional OS instance, such as with the implementation of a virtual machine (VM), and without a system reboot or application modification. Furthermore, the performance of the application is not degraded when it is presented to a processor architecture that is different from the actual architecture that is being used.

Likewise, system administrators are provided the flexibility of choosing from a variety of virtual processor architectures, any of which can then be selectively assigned to a predetermined isolated execution environment. As an example, a system administrator may select a virtual processor architecture that best suits a particular application, regardless of the actual processor architecture being used, to increase performance. As another example, different processor architectures may be selected for different workloads running in parallel on the same system, regardless of the actual processor architecture being used. As yet another example the same virtual processor architecture may be selected for distributed applications running on different processor architectures, to exchange raw, processor-specific data structures. As still another example, a virtual processor architecture may be selected that hides processor-specific features to enable workload migration towards actual processor architectures that do not currently support those features. Those of skill in the art will recognize that many such examples are possible and that the foregoing is not intended to limit the spirit, scope or intent of the invention.

Figure 3:
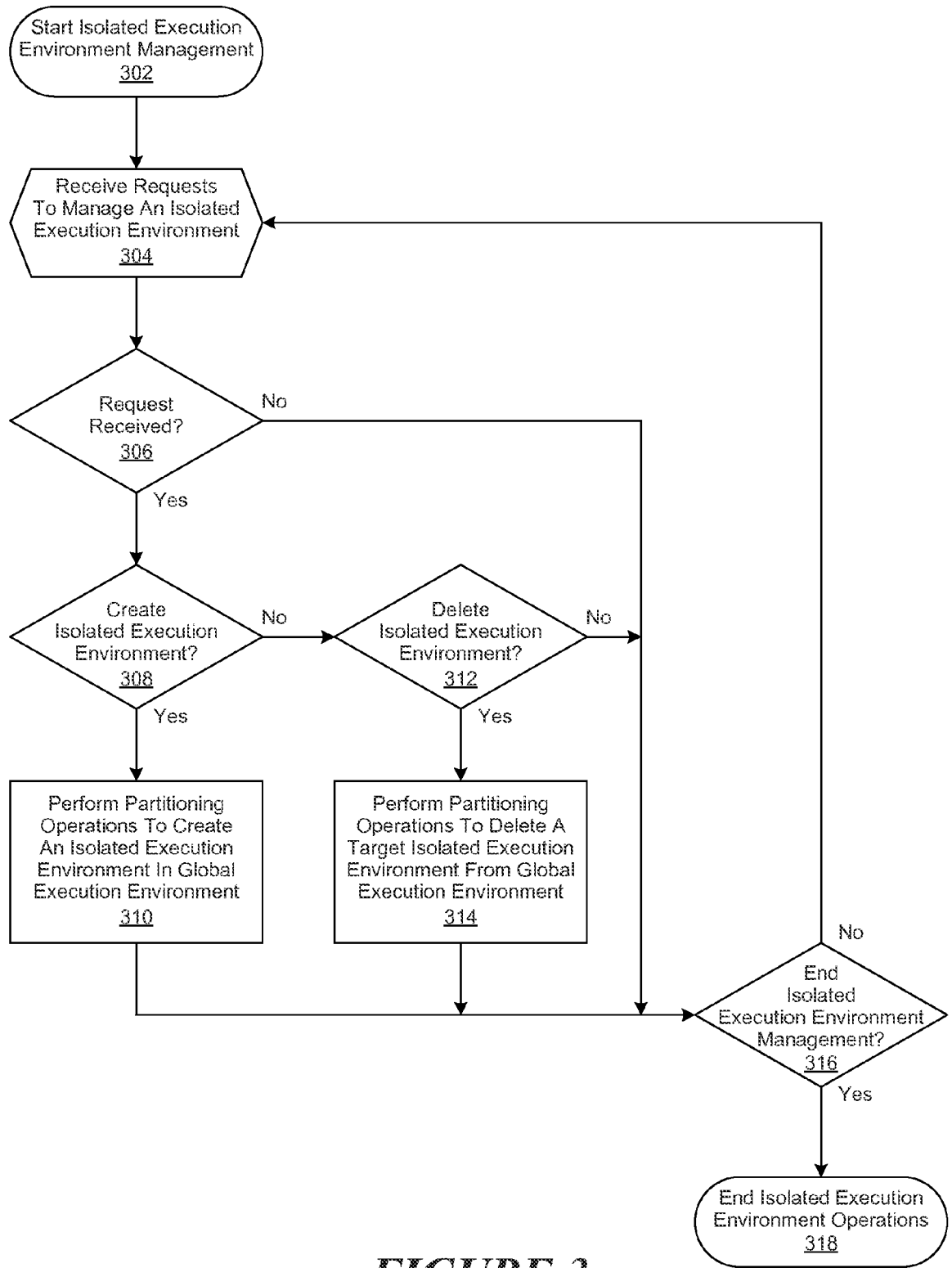
FIG. 3 is a generalized flowchart of isolated execution environment management operations.

FIG. 3 is a generalized flowchart of isolated execution environment management operations as implemented in accordance with an embodiment of the invention. In this embodiment, isolated execution environment management operations are begun in step 302, followed by the ongoing receipt of requests to manage an isolated execution environment in step 304. A determination is then made in step 306 whether such a request has been received. If not, then a determination is made in step 316 whether to end isolated execution environment management operations. If so, then isolated execution environment management operations are ended in step 318. Otherwise, the process is continued, proceeding with step 304.

However, if such a request was received in step 306, then a determination is made in step 308 whether the creation of an isolated execution environment has been requested. If so, then partitioning operations familiar to those of skill in the art are performed in step 310 to create an isolated execution environment within a global execution environment. The process is then continued, proceeding with step 316. In various embodiments, the isolated execution environment is "disposable," or "temporary." In these embodiments, the isolated execution environment is created prior to the creation of a new process. Thereafter, it is used solely for the execution of the new process and no others. In various embodiments, the isolated execution environment is persistent. In these embodiments, the isolated execution environment may be used for the execution of one or more processes.

However, if it was determined in step 308 that the creation of an isolated execution environment was not requested, then a determination is made in step 312 whether the deletion of an isolated execution environment has been requested. If so, then partitioning operations familiar to skilled practitioners of the art are performed in step 324 to delete a target isolated execution environment from the global execution environment. The process is then continued, proceeding with step 316. In various embodiment, the target isolated execution environment to be deleted is "disposable," or "temporary." In certain of these embodiments, the target isolated execution environment is automatically deleted when the execution of its associated process is ended. In various embodiments, the target isolated execution environment to be deleted is persistent. In certain of these embodiments, the target isolated execution environment is manually deleted when it's the execution of its one or more processes are ended. Those of skill in the art will recognize that many such embodiments are possible, and that the foregoing is not intended to limit the spirit, scope or intent of the invention.

Figure 4:
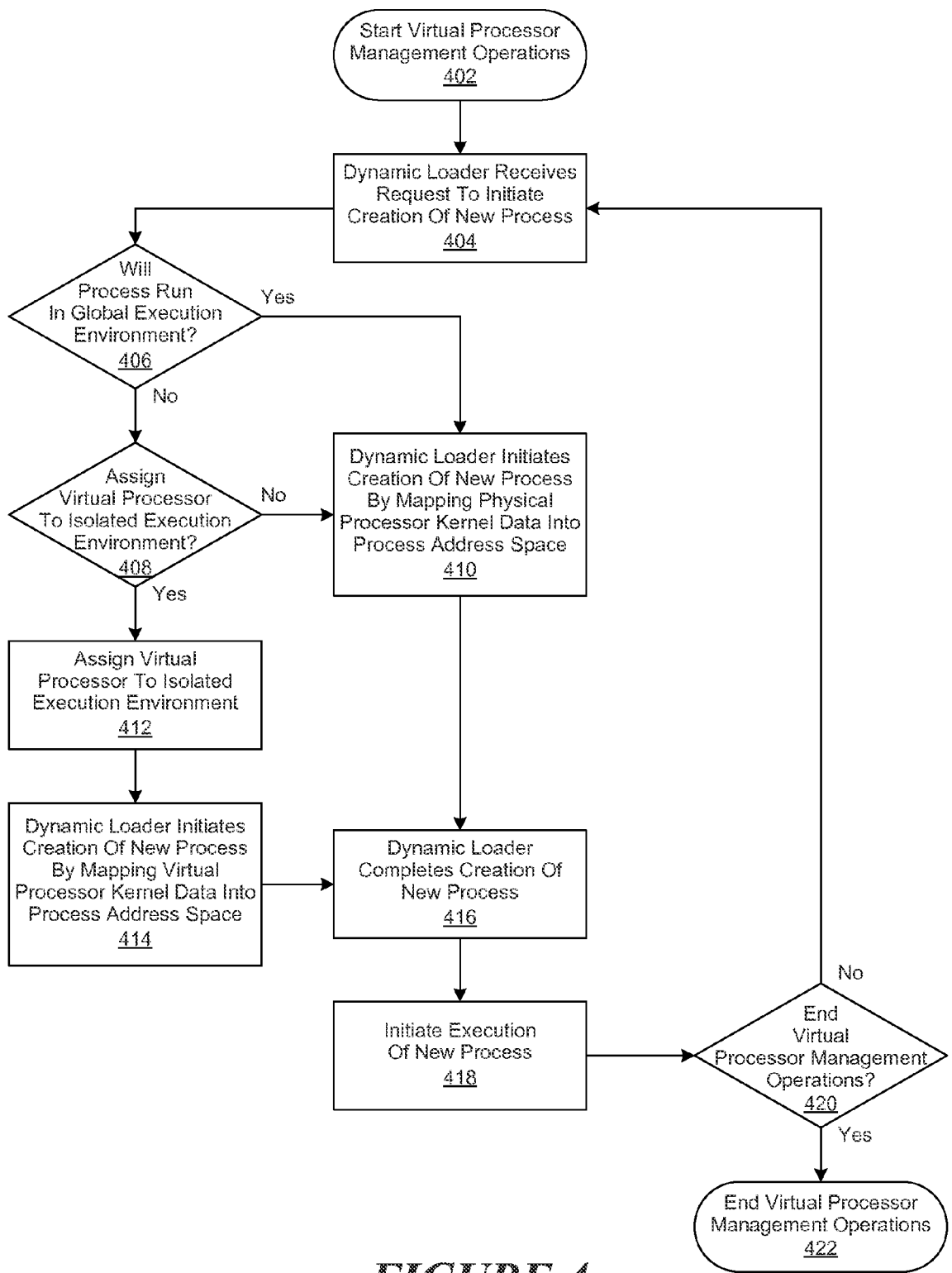
FIG. 4 is a generalized flowchart of virtual processor management operations.

FIG. 4 is a generalized flowchart of virtual processor management operations as implemented in accordance with an embodiment of the invention. In this embodiment, virtual processor management operations are begun in step 402, followed by a dynamic loader receiving a request to initiate the creation of a new process in step 44. A determination is then made in step 406 whether the new process will run in a global execution environment. If not, then a determination is made in step 408 whether to assign a virtual processor to a target isolated execution environment. If not, or if it was determined in step 406 that the new process will run in the global execution environment, then the dynamic loader initiates the creation of the new process in step 410 by mapping physical processor kernel data into the address space of the process.

Otherwise, a virtual processor is assigned to the isolated execution environment in step 312. In one embodiment, the assignment is performed by a user. In this embodiment, the user is provided a selection of virtual processor architectures within a user interface window. Once the selection is presented, the user selects the desired virtual processor architecture through the use of a user gesture familiar to those of skill in the art. In another embodiment, the process has a preferred virtual processor architecture, which is automatically selected. In this and other embodiments, a user predetermines the preferred virtual processor architecture for a target process.

Then, in step 414, then the dynamic loader initiates the creation of the new process in step 410 by mapping kernel data associated with the selected virtual processor into the address space of the process. Thereafter, or after the physical processor kernel data is mapped into the address space of the process in step 410, the dynamic loader completes the creation of the new process in step 416. The execution of the new process is then initiated in step 418, followed by a determination being made in step 420 whether to end virtual processor management operations. If not, then the process is continued, proceeding with step 404. Otherwise, virtual processor management operations are ended in step 422.

Although the present invention has been described in detail, it should be understood that various changes, substitutions and alterations can be made hereto without departing from the spirit and scope of the invention as defined by the appended claims.

What is claimed is:

1. A computer-implemented method for managing virtual processor operations, comprising:
   receiving a request to initiate creation of a first process, the first process having a corresponding address space;
   assigning a first virtual processor to a first isolated execution environment, the first isolated execution environment being created within a global execution environment by performing a partitioning operation, wherein the global execution environment is a non-virtualized operating system;
   mapping a first set of kernel data implemented within the global execution environment into the address space of the first process, the first set of kernel data associated with an architecture of the first virtual processor;
   completing the creation of the first process; and
   initiating the execution of the first process in the first isolated execution environment, wherein the architecture of the first virtual processor is different from the architecture of a physical processor being used by the global execution environment.

2. The method of claim 1, further comprising:
   receiving a request to create a second process, the second process having a corresponding address space;
   assigning a second virtual processor to a second isolated execution environment;
   mapping a second set of kernel data into the address space of the second process, the second set of kernel data associated with the second virtual processor;
   completing the creation of the second process; and
   initiating the execution of the second process in the second isolated execution environment.

3. The method of claim 2, wherein the assignment of the first virtual processor to the first isolated execution environment and the assignment of the second virtual processor to the second isolated execution environment is performed manually.

4. The method of claim 2, wherein the assignment of the first virtual processor to the first isolated execution environment and the assignment of the second virtual processor to the second isolated execution environment is performed automatically.

5. The method of claim 2, wherein:
   the first and second isolated execution environments are created within a global execution environment by performing partitioning operations;
   the architectures of the first and second virtual processors are different from the architecture of a physical processor being used by the global execution environment.

6. The method of claim 2, wherein the architecture of the first virtual processor is different from the architecture of the second virtual processor.

7. A system comprising:
   a processor;
   a data bus coupled to the processor; and
   a computer-usable medium embodying computer program code, the computer-usable medium being coupled to the data bus, the computer program code used for managing virtual processor operations and comprising instructions executable by the processor and configured for:
   receiving a request to initiate creation of a first process, the first process having a corresponding address space;
   assigning a first virtual processor to a first isolated execution environment, the first isolated execution environment being created within a global execution environment by performing a partitioning operation, wherein the global execution environment is a non-virtualized operating system;
   mapping a first set of kernel data implemented within the global execution environment into the address space of the first process, the first set of kernel data associated with an architecture of the first virtual processor;
   completing the creation of the first process; and
   initiating the execution of the first process in the first isolated execution environment, wherein the architecture of the first virtual processor is different from the architecture of a physical processor being used by the global execution environment.

8. The system of claim 7, further comprising:
   receiving a request to create a second process, the second process having a corresponding address space;
   assigning a second virtual processor to a second isolated execution environment;
   mapping a second set of kernel data into the address space of the second process, the second set of kernel data associated with the second virtual processor;
   completing the creation of the second process; and
   initiating the execution of the second process in the second isolated execution environment.

9. The system of claim 8, wherein the assignment of the first virtual processor to the first isolated execution environment and the assignment of the second virtual processor to the second isolated execution environment is performed manually.

10. The system of claim 8, wherein the assignment of the first virtual processor to the first isolated execution environment and the assignment of the second virtual processor to the second isolated execution environment is performed automatically.

11. The system of claim 8, wherein:
the first and second isolated execution environments are created within a global execution environment by performing partitioning operations;
the architectures of the first and second virtual processors are different from the architecture of a physical processor being used by the global execution environment.

12. The system of claim 8, wherein the architecture of the first virtual processor is different from the architecture of the second virtual processor.

13. A non-transitory, computer-readable storage medium embodying computer program code, the computer program code comprising computer executable instructions configured for:
receiving a request to initiate creation of a first process, the first process having a corresponding address space;
assigning a first virtual processor to a first isolated execution environment, the first isolated execution environment being created within a global execution environment by performing a partitioning operation, wherein the global execution environment is a non-virtualized operating system;
mapping a first set of kernel data implemented within the global execution environment into the address space of the first process, the first set of kernel data associated with an architecture of the first virtual processor;
completing the creation of the first process; and
initiating the execution of the first process in the first isolated execution environment, wherein the architecture of the first virtual processor is different from the architecture of a physical processor being used by the global execution environment.

14. The non-transitory, computer-readable storage medium of claim 13, further comprising:
receiving a request to create a second process, the second process having a corresponding address space;
assigning a second virtual processor to a second isolated execution environment;
mapping a second set of kernel data into the address space of the second process, the second set of kernel data associated with the second virtual processor;
completing the creation of the second process; and
initiating the execution of the second process in the second isolated execution environment.

15. The non-transitory, computer-readable storage medium of claim 14, wherein the assignment of the first virtual processor to the first isolated execution environment and the assignment of the second virtual processor to the second isolated execution environment is performed manually.

16. The non-transitory, computer-readable storage medium of claim 14, wherein the assignment of the first virtual processor to the first isolated execution environment and the assignment of the second virtual processor to the second isolated execution environment is performed automatically.

17. The non-transitory, computer-readable storage medium of claim 14, wherein:
the first and second isolated execution environments are created within a global execution environment by performing partitioning operations;
the architectures of the first and second virtual processors are different from the architecture of a physical processor being used by the global execution environment.

18. The non-transitory, computer-readable storage medium of claim 14, wherein the architecture of the first virtual processor is different from the architecture of the second virtual processor.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *